United States Patent
Bollin et al.

(10) Patent No.: US 10,440,886 B2
(45) Date of Patent: Oct. 15, 2019

(54) FEEDRATE CONTROL WITH SLIP COMPENSATION

(71) Applicant: Deere & Company, Moline, IL (US)

(72) Inventors: Douglas J. Bollin, Port Byron, IL (US); Cody W. Best, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/716,879

(22) Filed: Sep. 27, 2017

(65) Prior Publication Data

US 2019/0090421 A1    Mar. 28, 2019

(51) Int. Cl.
  *G06F 7/70* (2006.01)
  *A01D 41/127* (2006.01)
  *A01D 75/28* (2006.01)
  *B60T 8/172* (2006.01)

(52) U.S. Cl.
  CPC ..... *A01D 41/1273* (2013.01); *A01D 41/1274* (2013.01); *A01D 75/28* (2013.01); *B60T 8/172* (2013.01); *B60Y 2200/222* (2013.01)

(58) Field of Classification Search
  None
  See application file for complete search history.

(56) References Cited

U.S. PATENT DOCUMENTS

| | | | |
|---|---|---|---|
| 6,951,514 | B1 | 10/2005 | Coers |
| 7,921,626 | B2 | 4/2011 | Maertens et al. |
| 9,255,639 | B2 | 2/2016 | Dueckinghaus et al. |
| 9,629,308 | B2 * | 4/2017 | Scholer .................. G01F 1/662 |
| 9,631,964 | B2 * | 4/2017 | Gelinske ................ G01F 1/666 |
| 10,085,379 | B2 * | 10/2018 | Schleusner ........ A01D 41/1271 |
| 2004/0194442 | A1 * | 10/2004 | Maertens ............ A01B 79/005 |
| | | | 56/10.2 R |

FOREIGN PATENT DOCUMENTS

| | | |
|---|---|---|
| EP | 0914765 A1 | 5/1999 |
| EP | 1051898 A2 | 11/2000 |
| WO | 8704894 A1 | 8/1987 |

OTHER PUBLICATIONS

EP Application No. 18196306.7 Extended European Search report dated Mar. 6, 2019, 6 pages.

* cited by examiner

*Primary Examiner* — Adam M Alharbi
(74) *Attorney, Agent, or Firm* — Joseph R. Kelly; Kelly, Holt & Christenson PLLC

(57) ABSTRACT

A prescribed feedrate of material through the mobile harvesting machine and an actual feedrate of material through the mobile harvesting machine are detected, and a feedrate difference between the prescribed feedrate and the actual feedrate is identified. Wheel slippage of the mobile harvesting machine is also detected. Based on the feedrate difference between the prescribed feedrate and the actual feedrate and based on the detected wheel slippage, a speed control signal that controls speed of the mobile harvesting machine is generated.

20 Claims, 10 Drawing Sheets

FEEDRATE CONTROL WITH SLIP COMPENSATION

FIELD OF THE DESCRIPTION

The present description relates to a control system for an agricultural machine. More specifically, the present description relates to a feedback control system for automatically controlling feedrate of a mobile harvesting machine.

BACKGROUND

There are a wide variety of different types of equipment, such as construction equipment, turf care equipment, forestry equipment and agricultural equipment. These types of equipment are often operated by an operator.

For instance, a combine harvester (or combine) is operated by an operator, and it has many different mechanisms that are controlled by the operator in performing a harvesting operation. The combine may have multiple different mechanical, electrical, hydraulic, pneumatic, electromechanical (and other) subsystems, some or all of which can be controlled, at least to some extent, by the operator. The systems may need the operator to make a manual adjustment outside the operator's compartment or to set a wide variety of different settings and provide various control inputs in order to control the combine. Some inputs not only include controlling the combine direction and speed, but also threshing clearance and sieve settings, rotor and fan speed settings, and a wide variety of other settings and control inputs.

Some systems within the combine are automatically controlled during an operation according to a fixed feedback loop, and therefore require little to no operator input to maintain operating parameters of the combine. Because of the complex nature of the combine operation, it can be very difficult for control systems to accommodate for a wide variety of variations that may arise during an operation.

The discussion above is merely provided for general background information and is not intended to be used as an aid in determining the scope of the claimed subject matter.

SUMMARY

A prescribed feedrate of material through the mobile harvesting machine and an actual feedrate of material through the mobile harvesting machine are detected, and a feedrate difference between the prescribed feedrate and the actual feedrate is identified. Wheel slippage of the mobile harvesting machine is also detected. Based on the feedrate difference between the prescribed feedrate and the actual feedrate and based on the detected wheel slippage, a speed control signal that controls speed of the mobile harvesting machine is generated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
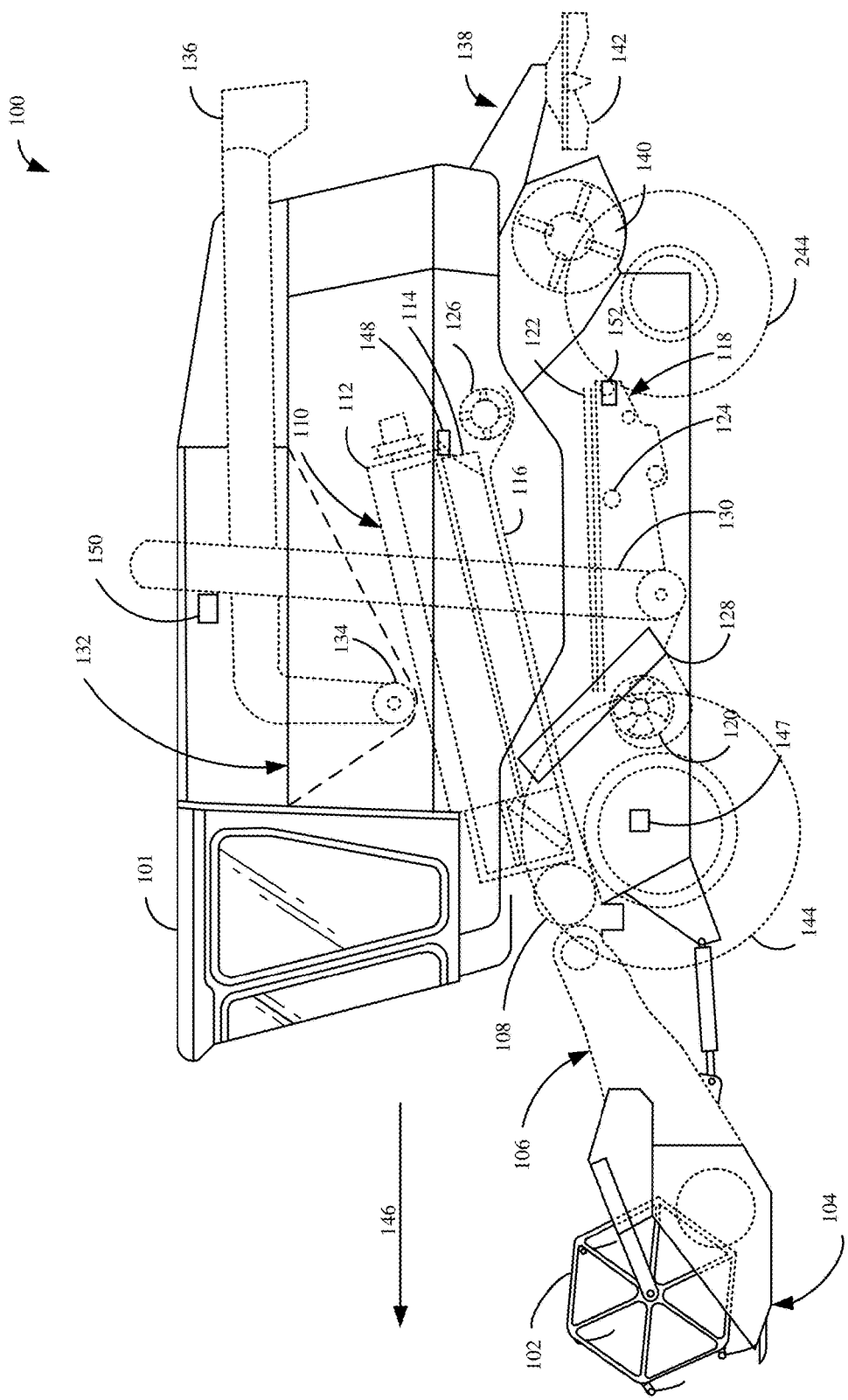
FIG. 1 is a partial pictorial, partial schematic illustration of a combine harvester.

Combine harvesters (also referred to herein as a combine, a harvester or a machine) often have a wide variety of sensors that sense a variety of different variables, such as operating parameters, along with crop characteristics, environmental parameters, etc. The sensors can communicate this information over a controller area network (CAN) bus (or another network, such as an Ethernet network, etc.) to various systems, either internal or external to the combine, that can process the sensor signals and generate output signals (such as control signals) based on the sensed variables. Given the complex nature of the control operations needed to operate a combine harvester, and given the wide variety of different types of settings and adjustments that an operator can make, and further given the widely varying different types of crops, terrain, crop characteristics, etc. that can be encountered by a combine harvester, it can be very difficult to maintain parameters of the combine harvester in order to achieve and/or improve a desired measure of a harvesting operation.

One example measure of a harvesting operation that can be sensed by one or more of the sensors, and used in controlling the combine, includes a measure of feedrate. Feedrate is generally described herein as an amount of crop harvested by a combine over an amount of time (e.g., during a particular harvesting operation). Feedrate can be indicated by crop throughput or crop load, such as a sensed crop load on a cylinder or drum as crop is harvested and accelerated through a combine. Thus, use of the term "feedrate" herein generally refers to an amount (or other metric indicative of the feedrate) of biomass (grain plus material other than grain —MOG- or other harvested material) through combine 100 per unit time.

It is often desirable to maintain a relatively constant feedrate. For example, maintaining a constant feedrate can maximize productivity of the combine by reducing grain loss and thereby minimizing under-load and over-load conditions. For instance, it will be appreciated that performance indicators like the measure of grain loss (e.g., percent grain loss from shoe, accelerator, drum, etc.) have been determined to increase when throughput is also increased.

As noted above, given the widely varying characteristics of harvesting operations, such as varying crop density and crop quality (e.g., down crop), some systems attempt to maintain a relatively constant feedrate by automatically controlling a forward speed of the combine. For example, some systems implement a feedback control loop that detects a decrease in feedrate and, in response, automatically requests an increase in the forward speed of the combine. A sensed decrease in feedrate may indicate a decreased crop density for a particular harvesting area. By increasing the combine speed, the combine travels across that particular harvesting area more quickly, and thus compensates for the drop in crop density, to maintain the feedrate. On the other hand, if the combine senses an increase in feedrate, this may reflect an increased crop density and the feedback control loop causes the combine to decrease speed. When speed is decreased, the combine travels across less area over a period of time, and thus compensates for the increase in density to maintain the feedrate.

However, these and similar feedback control loops do not take into consideration other sensed characteristics of the combine and/or performance measures of the harvesting operation in attempting to maintain a relatively constant feedrate. Particularly, problems can arise when a forward speed of the combine differs from a speed output that is generated by a propulsion system (e.g., when the forward speed of the combine does not match the wheel speed). This problem can be exacerbated when a combine experiences wheel slippage caused by any of a wide variety of different conditions.

By way of example, assume that a combine is traveling uphill over muddy terrain and the wheels begin to slip. This means that the forward speed of the combine will decrease, resulting in a corresponding drop in feedrate. In some current systems, this is interpreted by a feedrate controller as the combine entering an area of relatively low crop density. Thus, the feedrate controller will request an increase in travel speed of the combine. However, increasing wheel speed (to increase the travel speed of the combine) will increase wheel slippage, which slows the travel speed of the combine further, which results in the feedrate controller requesting an even greater increase in travel speed. This can continue until the wheel slippage is so great that the travel speed of the combine slows to a stop.

Thus, the present description describes a feedrate control systems that detects wheel slippage and generates control signals that control parameters of the combine to maintain the desired feedrate, while mitigating the negative effects of wheel slippage on productivity.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concave 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well. FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed. Also, the travel speed of combine 100 can be sensed (e.g., using a GPS receiver) and the wheel speed can also be sensed (e.g., by a wheel speed sensor). These two signals can be compared to determine wheel slippage conditions, as is described in more detail below.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) sensor and a MOG moisture sensor that can be configured to sense the amount of MOG entering the clean grain tank and moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feedrate, as it travels through clean grain elevator 130. They can sense mass flow rate of grain through elevator 130, or provide other output signals indicative of other sensed variables. Some additional examples of the types of sensors that can be used are described below.

Figure 2:
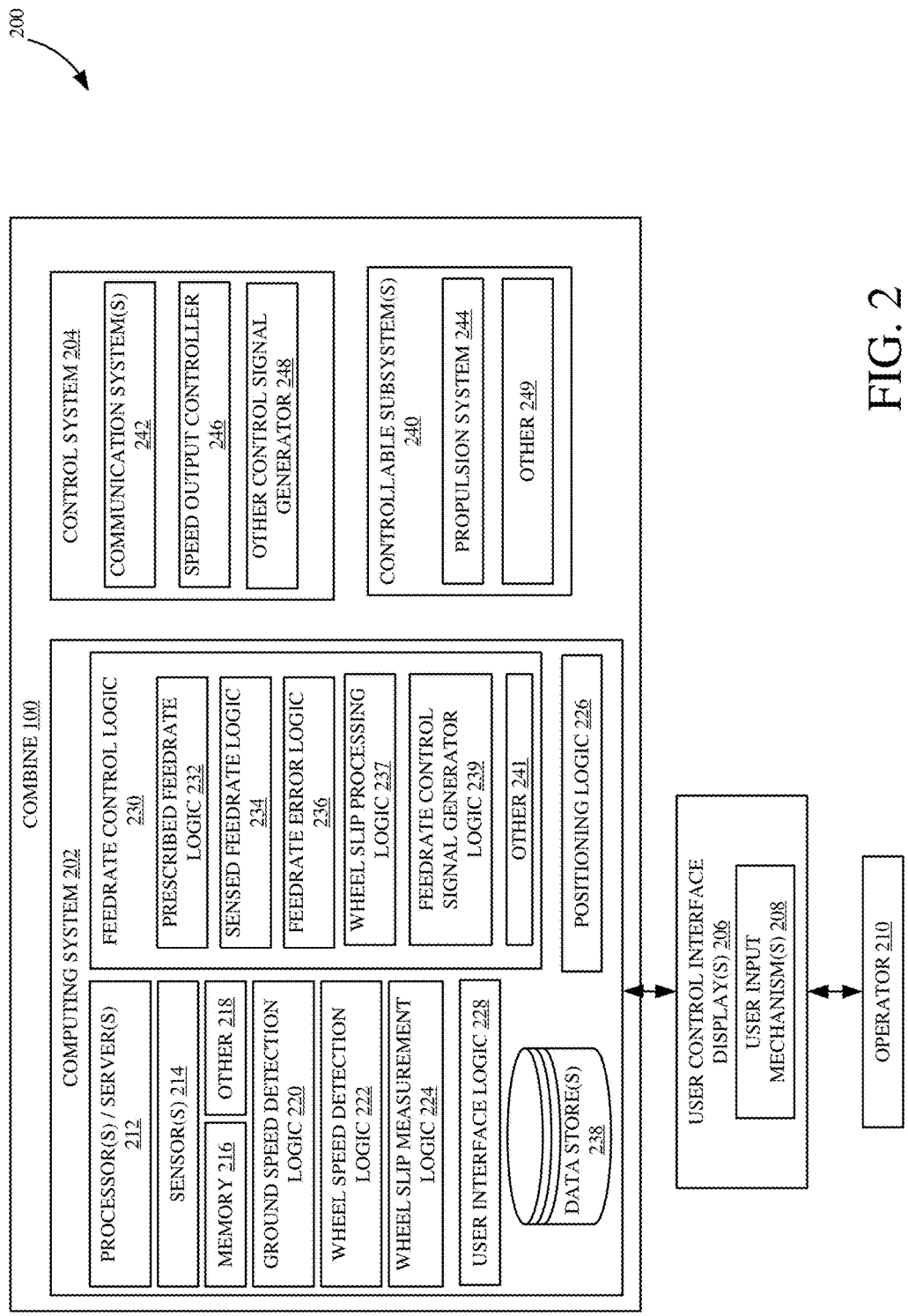
FIG. 2 is a block diagram of one example of a computing system architecture that includes the combine harvester illustrated in FIG. 1.

FIG. 2 is a block diagram showing one example of an architecture 200 that includes combine harvester 100. In one example, combine harvester 100 can generate operator interface displays 206 with user input mechanisms 208 for interaction by operator 210. Operator 210 is illustratively a local operator of combine 100, in the operator's compartment 101 of combine 100, and can interact with user input mechanisms 208 in order to control and manipulate combine harvester 100. User input mechanisms 208 can include one or more display devices, one or more audio devices, one or more haptic devices, and it can include other items, such as a steering wheel, joysticks, pedals, levers, buttons, keypads, etc.

Before describing the overall operation of architecture 200 in more detail, a brief description of some of the items in architecture 200, and their operation, will first be provided. As shown in FIG. 2, in addition to the items described above with respect to FIG. 1, combine 100 can include computing system 202, and one or more control systems 204. Computing system 202, itself, can include one or more processors or servers 212, a plurality of different sensors 214, memory 216, ground speed detection logic 220, wheel speed detection logic 222, wheel slip measurement logic 224, positioning logic 226, user interface logic 228, one or more data stores 238, and feedrate control logic 230. Feedrate control logic 230, itself, illustratively includes prescribed feedrate logic 232, sensed feedrate logic 234, feedrate error logic 236, wheel slip processing logic 237, feedrate control signal generator logic 239, and it can include other items 241. Computing system 202 can also include a wide variety of other items 218.

As described above with respect to FIG. 1, sensor(s) 214 can generate a wide variety of different sensor signals representing a wide variety of different sensed variables. Feedrate control logic 230 (as described in greater detail below with respect to FIG. 3) illustratively generates metrics indicative of the operational performance of combine 100, such as by generating metrics indicative of feedrate during a harvesting operation. That is, feedrate control logic 230 generates metrics indicative of a rate at which material moves through combine 100. This can be sensed at a variety of different places in combine 100 (such as a mass flow of grain entering the clean grain tank, a measure of material passing through the feeder house, etc.). Feedrate control logic 230 then generates speed request signals to increase travel speed of combine 100, decrease it, or maintain it the same, in an attempt to maintain a constant feedrate through combine 100.

User interface logic 228 illustratively generates user control interface display 206 for operator 210. Display 206 can be an interactive display with user input mechanisms 208 for interaction by operator 210. Display 206 can also or alternatively be integrated with one or more of the variety of different user input mechanisms 208 for interaction by operator 210.

Control system 204 illustratively includes one or more communication system(s) 242, a speed output controller 246, among a wide variety of other items such as other control signal generators 248. Communication system(s) 242 can include one or more communication systems that allow combine 100 to communicate with a remote analytics computing system and/or a remote manager computing system. Thus, they include one or more communication systems that can communicate over communication networks discussed above, cellular communication networks, near-field communication networks, or a wide variety of other networks or combinations of networks.

Control system 204 can generate control signals for controlling a variety of different controllable subsystems 240 based on the sensor signals generated by sensor(s) 214, based on the feedrate metrics and speed requests generated by feedrate control logic 230, based upon user inputs received through user input mechanisms 208, or it can generate control signals in a wide variety of other ways as well. Controllable subsystems 240 can include a variety of different systems, such as a threshing subsystem as described above with respect to FIG. 1, a cleaning subsystem (such as the cleaning fan, the chaffer, the sieve, etc.) and a variety of other controllable subsystems 249, some of which are discussed above with respect to FIG. 1. One example of a controllable subsystem that will be particularly discussed in further detail below (e.g., with respect to FIG. 3) includes propulsion system 244. Propulsion system 244 is generally configured to drive combine 100 and includes an engine that drives wheels, such as ground engaging wheels 144, or other ground engaging traction elements.

Positioning logic 226 illustratively generates one or more signals indicative of a position of combine 100 at any given time during an operation. Generally, positioning logic 226 receives sensor signals from one or more sensor(s) 214, such as a global positioning system (GPS) receiver, a dead reckoning system, a LORAN system, or a wide variety of other systems or sensors, to determine positions of combine 100 across a worksite. Thus, ground speed detection logic 220 can utilize positioning information from positioning logic 226 to generate an indication of ground travel speed of combine 100. Positioning logic 226 can also access data store 238 to retrieve stored positioning information that indicates positions of combine 100 in performing historical operations, as well as the paths and/or patterns of travel of combine 100 during performance of said historical operations.

Wheel speed detection logic 222 illustratively detects a wheel speed of combine 100, such as a rotational speed of wheels (e.g., rotational speed of ground engaging wheels 144 discussed with respect to FIG. 1) or an axle, etc. Wheel speed detection logic 222 can detect wheel speed in a wide variety of different ways. In one example, but not by limitation, wheel speed detection logic 222 receives one or more sensor signals from sensor(s) 214 indicative of the rotational speed of one or more wheels.

Ground speed detection logic 220 illustratively detects an indication of a ground speed (which may be different from wheel speed) of combine 100 during performance of a harvesting operation. Ground speed can generally include a distance that combine 100 travels during a period of time. Ground speed detection logic 220 can differentiate between a ground speed being indicative of forward and reverse speeds, and can account for a directional heading of combine 100. For example, ground speed detection logic 220 receives sensor signals from sensor(s) 214, such as ground speed sensor 147, a GPS receiver, a radar system, or other positioning logic 226 that measures geographical movement of combine 100 over time.

Wheel slip measurement logic 224 illustratively generates a metric indicative of wheel slippage experienced by combine 100. Wheel slippage is generally described herein as a longitudinal slip calculated as a difference between wheel speed and ground speed. That is, wheel slip measurement logic 224 is configured to measure wheel slippage by comparing wheel speed, as detected by wheel speed detection logic 222, to ground speed, as detected by ground speed detection logic 220. In one example, wheel slip measurement logic 224 quantifies the measure of wheel slippage. For instance, wheel slip measurement logic 224 quantifies wheel slippage by comparing a measured (e.g., a current) wheel slippage to a set of wheel slippage rates stored in association with data store(s) 238. Stored wheel slippage rates (e.g., the rate of wheel slippage being indicative of an amount of wheel slippage over time and/or how the wheel slippage changes over time) and/or stored wheel slippage measurements can be indicative of varying levels of wheel slippage, and can be categorized relative to one or more threshold values of slip. In one example, but not by limitation, wheel slip measurement logic 224 quantifies a detected wheel slippage as either being a value that is acceptable or unacceptable. In one example, wheel slip measurement logic 224 can further quantify the detected wheel slippage as being: low wheel slippage, medium wheel slippage, or high wheel slippage. Of course, a variety of other quantifications can be used in addition or alternatively to those described herein. A measure of the wheel slippage, as quantified by wheel slip measurement logic 224, is utilized by architecture 200 to improve performance of combine 100. In particular, a measured value of wheel slippage can be used by wheel slip processing logic 237 and feedrate control signal generator logic 239 in generating a request for increased speed, decreased speed or no change in speed to speed output controller 246. That is, wheel slip processing logic 237 can compare the measured value of wheel slippage to one or more stored values of measured wheel slippage, such as a threshold slippage value (e.g., stored in association with data store(s) 238). If it is too high, then logic 237 may control logic 239 to refrain from requesting an increase in speed, even if the feedrate has dropped. Thus, feedrate control logic 230 considers wheel slippage to control combine 100 to maintain a relatively constant feedrate.

Feedrate control logic 230 illustratively receives one or more sensor signals from sensor(s) 214, and also receives information from one or more of ground speed detection logic 220, wheel speed detection logic 222, wheel slip measurement logic 224, positioning logic 226, and user interface logic 228 (as well as any of the other logic components of computing system 202 as described herein) to generate feedrate control signals (e.g., speed request signals) that are used in an attempt to control a feedrate of combine 100. As such, feedrate control logic 230 is configured to identify a feedrate difference between a prescribed feedrate (e.g., a goal or target feedrate metric) and an actual feedrate (e.g., a current feedrate experienced by combine 100 during performance of a current operation).

Prescribed feedrate logic 232 illustratively generates a sensor signal indicative of a prescribed feedrate for combine 100 in performing a particular operation. In one example, operator 210 interacts with user input mechanisms 208 to provide a user input indicative of a prescribed feedrate. For instance, operator 210 provides an input indicative of a desired value of the amount of biomass the machine is taking in over time (e.g., tons/ac, given a speed) or any other of a wider variety of measures of total feedrate (e.g., amount of crop that moves through a harvesting machine per unit time or distance traveled). In one example, but not by limitation, prescribed feedrate logic 232 automatically selects a prescribed feedrate, from a plurality of available prescribed feedrates that are stored in association with data store(s) 238, based on any of a wide variety of different parameters such as a type of harvesting operation, a current ground speed of combine 100, among other sensor and/or performance characteristics of combine 100.

Sensed feedrate logic 234 illustratively generates a signal indicative of a sensed feedrate experienced by combine 100 in performing a particular operation. That is, sensed feedrate logic 234 can receive one or more sensor signals and/or performance information from computing system 202 to calculate a measure of an actual feedrate, or an actual amount of material moving through combine 100. Sensed feedrate logic 234 can be configured to calculate and monitor an actual feedrate of combine 100 continuously, at pre-defined intervals, or at specific points during performance of an operation, thus providing various values indicative of an actual feedrate. One example of a sensed feedrate includes an indication of crop throughput or load that is passed and/or accelerated through combine 100. This (total feedrate) is indicative of an amount of biomass per unit time that the machine is taking in. This can be obtained using a sensor that senses and quantifies total feedrate, such as a pressure sensor on a cam of the rotor drive system that drives rotor 112. On a walker machine, it may be a pressure sensor on a cam of the cylinder drive. It can be other sensors that generate a sensor signal indicative of total feedrate as well.

Feedrate error logic 236 illustratively generates a signal indicative of whether the sensed (e.g., actual) feedrate is acceptable or unacceptable by measuring a difference between the prescribed feedrate and the current, actual feedrate. In one example, feedrate error logic 236 determines whether the actual feedrate is too high or too low. For instance, feedrate error logic 236 can compare the actual feedrate to the prescribed feedrate, and feedrate error logic 236 may determine that the actual feedrate is below the prescribed feedrate for the current operation. This determination may indicate that combine 100 should be controlled so the actual feedrate increases. For instance, the combine 100 can be controlled to increase its ground speed. In addition, feedrate error logic 236 may determine that the actual feedrate is above the prescribed feedrate for the operation. It may be that combine settings are set for processing material best at the prescribed feedrate. Therefore, in response to this particular determination, feedrate control logic 230 can determine that combine 100 should be controlled to decrease the feedrate, for example by decreasing the speed of combine 100.

In one example, in response to feedrate control logic 230 determining that the actual feedrate is not acceptable (e.g., too high or too low), computing system 202 controls wheel slip measurement logic 224 to determine whether combine 100 is experiencing wheel slippage. Rather than adjusting the speed of combine 100 in response to determining that the feedrate is to be adjusted, examples of architecture 200 described herein consider various characteristics of any detected wheel slippage prior to generating a speed request signal. Briefly, and as will be discussed in further detail below, when a current feedrate is determined to be too low, wheel slip detection logic 222 determines whether wheel slippage of combine 100 is present. If wheel slippage is determined to be present, the magnitude of slippage is detected by wheel slip measurement logic 224 and wheel slip processing logic 237 and feedrate control signal generator logic 239 generate a speed request signal based on the slippage. For instance, feedrate control signal generator logic 239 illustratively generates a request signal and provides it to speed output controller 246 which, in turn, generates a speed control signal that is provided to propulsion system 244 to adjust a ground speed of combine 100.

Figure 3:
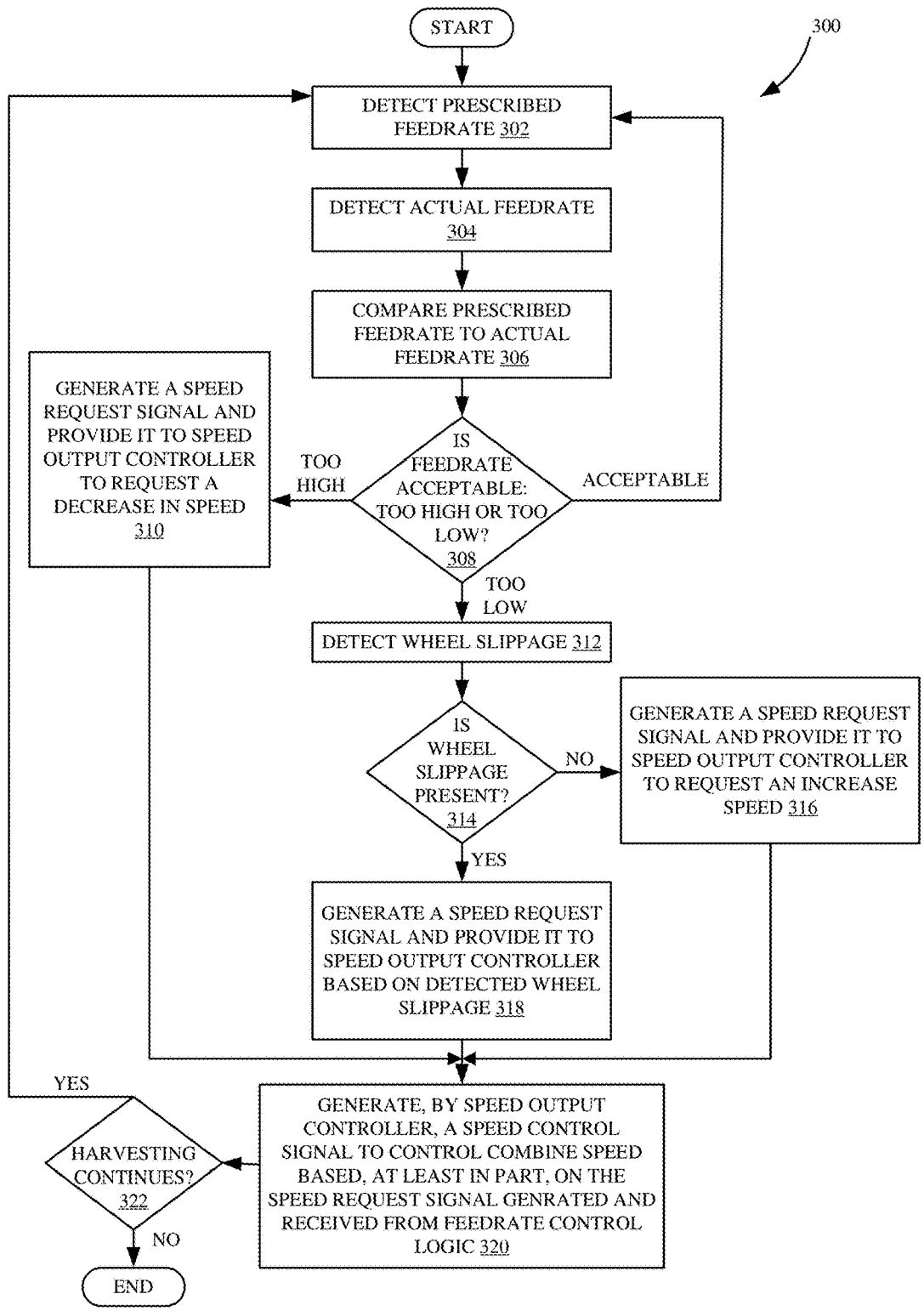
FIG. 3 illustrates a flow diagram showing one example operation of performing a speed adjustment for feedrate control.

FIG. 3 illustrates a flow diagram showing one example of the operation of computing system 202 in performing a speed adjustment based on feedrate control. At block 302, prescribed feedrate logic 232 detects a prescribed feedrate, indicative of a prescribed amount of material that moves through combine 100, and corresponding to a particular harvesting operation.

At block 304, sensed feedrate logic 234 detects an actual feedrate. For example, sensed feedrate logic 234 receives one or more sensor signals and, based on the sensor signals received, generates a signal indicative of a current feedrate that is experienced by combine 100 in performing a particular operation.

At block 306 feedrate error logic 236 compares the prescribed feedrate to the actual feedrate. For example, feedrate error logic 236 identifies a difference between the prescribed feedrate and the actual feedrate. In accordance with block 306, the difference between the prescribed and actual feedrates can be compared to a threshold difference value or range of values. For instance, the comparison can include determining whether the actual feedrate is within a range of feedrate values above or below the prescribed feedrate. Of course, it will be appreciated that a variety of other comparisons can also or alternatively be performed in accordance with block 306.

At decision block 308, feedrate error logic 236 determines whether the actual feedrate is acceptable or unacceptable. The actual feedrate can be acceptable if, for instance, it matches the prescribed feedrate or is within a defined range of feedrate values above or below the prescribed feedrate value. If the actual feedrate is determined to be acceptable, processing illustratively returns to block 302 to detect any new prescribed feedrate and actual feedrate and continue processing for further determination of whether the new, actual feedrate is acceptable or unacceptable. In other words, if combine 100 is performing at a desired or prescribed performance regarding the amount of crop traveling through the machine per unit time, then the feedrate controller determines that no speed adjustments and/or wheel slip determinations need to be made.

However, if at decision block 308 feedrate error logic 236 determines that the actual feedrate is unacceptable, feedrate error logic 236 utilizes the comparison relative to the prescribed feedrate to determine whether the actual feedrate is too high or too low. In one example, feedrate error logic 236 determines an error value of the actual feedrate in accordance with decision block 308.

If feedrate error logic 236 determines that the actual feedrate is too high (e.g., more crop throughput than a desired, prescribed crop throughput), then feedrate control signal generator logic 239 generates a control signal and provides it to speed output controller 246 to request a decrease in speed of combine 100, as illustratively shown at block 310. Speed output controller 246 can, in turn, generate a speed control signal that decreases an output speed of propulsion system 244 according to the received speed request signal, in accordance with the processing illustratively shown at block 320 (which will be discussed in further detail below).

Turning again to decision block 308, if feedrate error logic 236 determines that the actual feedrate is too low (e.g., less crop throughput than a desired, prescribed crop throughput), processing illustratively continues at block 312. At block 312, wheel slip measurement logic 224 detects whether combine 100 is experiencing wheel slippage. In one example and in accordance with block 312, wheel slip measurement logic 224 generates a signal indicative of a detected wheel slippage. For instance, wheel slip measurement logic 224 compares a detected ground speed of combine 100 (e.g., a real-world travel speed of a mobile machine as it travels across a worksite, as sensed by a GPS receiver or determined using other positioning or ground speed information such as positioning logic 226) to a detected wheel speed of combine 100 (e.g., sensed rotational speed of ground engaging wheels or other traction equipment, or axle or drivetrain speed output as sensed by one or more sensors). Of course, wheel slip measurement logic 224 can detect wheel slippage at block 312 by measuring wheel slippage in accordance with any other ways.

At decision block 314, wheel slip processing logic 237 determines whether wheel slippage is present and, if so, the degree of slippage. In one example, wheel slip processing logic 237 receives a signal indicative of a level of measured wheel slippage that is detected by wheel slip measurement logic 224. For instance, wheel slip processing logic 237 determines whether the measured value of wheel slippage, indicated by the signal received from wheel slip measurement logic 224, indicates that slippage is present by comparing the detected measure of wheel slippage to a threshold value of wheel slippage, or by any of a wide variety of other ways of determining whether wheel slippage is present.

If, at decision block 314, wheel slip processing logic 237 determines that wheel slippage is not detected, but it has been determined by feedrate error logic 236 that the feedrate is unacceptably low, processing continues at block 316. At block 316, feedrate control signal generator logic 239 generates a speed request signal and provides it to speed output controller 246 to request an increase in speed of combine 100. Speed output controller 246 can, in turn, generate a speed control signal that increases an output speed of propulsion system 244 according to the received speed request signal, in accordance with the processing illustratively shown at block 320 (which will be discussed in further detail below). For instance, where the actual feedrate has decreased and that there is no wheel slippage present, and controller 246 can instruct combine 100 to increase travel speed to compensate for the decreased feedrate.

However, if at decision block 314, wheel slip processing logic 237 determines that wheel slippage is present, as detected by wheel slip measurement logic 224 at block 312, processing illustratively continues at block 318. At block 318, feedrate control signal generator logic 239 generates a speed request signal and provides it to speed output controller 246 based on the detected wheel slippage being present. Examples of this are described in more detail below. By way of overview, wheel slip processing logic 237 generates a signal indicative of the detected wheel slippage being present and provides the signal to feedrate control signal generator logic 239. In accordance with block 318, feedrate control signal generator logic 239 receives the signal that indicates wheel slippage being present and takes that into consideration in generating the speed request signal. Of course, other parameters can be used in addition or alternatively in generating a speed request signal in accordance with block 318.

At block 320, speed output controller 246 receives the speed request signal from feedrate control signal generator logic 239 and, in turn, generates a speed control signal that instructs combine 100 to adjust or maintain travel speed of combine 100. For instance, speed output controller 246 can receive an indication of the speed request signal and generate instructions (e.g., a speed control signal) to adjust operating parameters of combine 100 which, in turn, control travel speed of combine 100. Thus, at block 320, speed output controller 246 generates the speed control signal based, at least in part, on the measured wheel slippage, relative to the measured feedrate error, and/or other parameters such as whether the wheel slippage is likely to continue, as will be discussed in further detail below, in an attempt to control actual feedrate of combine 100 by controlling travel speed of combine 100. The speed control signal, as generated by speed output controller 246 and in accordance with block 320, can, for example, control propulsion system 244 to increase a speed output, decrease a speed output, maintain a current speed output, maintain a prescribed speed output, or perform another operation such as implementing a series of incremental speed increases, or by performing a wide variety of other speed adjustments to combine 100.

At decision block 322, feedrate control logic 230 determines whether a harvesting operation continues. If feedrate control logic 230 determines that harvesting does not continue, processing illustratively ends. If feedrate control logic 230 determines that harvesting is continuing, processing illustratively returns to block 302 where a new, prescribed feedrate is detected. Thus, feedrate and wheel slippage are monitored and used to automatically adjust operating parameters of combine 100, particularly to control a travel speed of combine 100.

Figure 4:
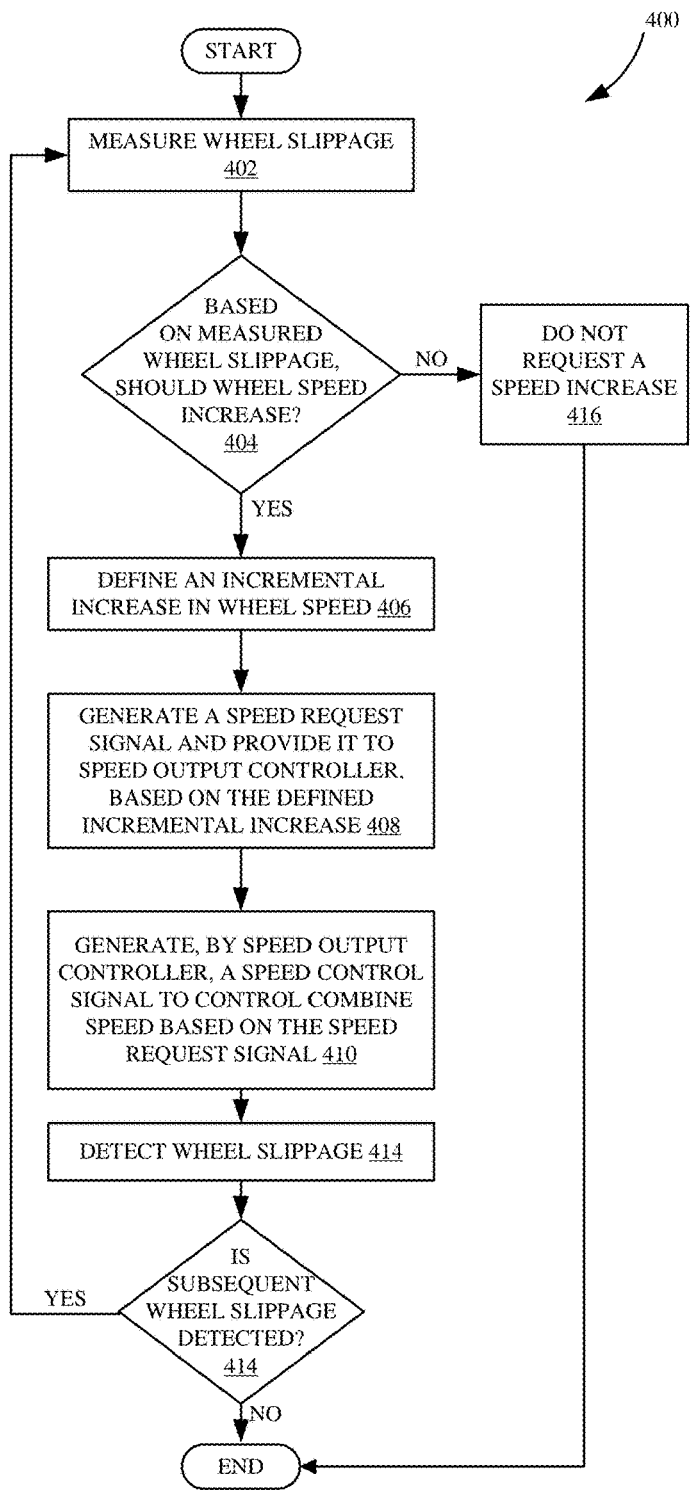
FIG. 4 illustrates a flow diagram showing one example operation of measuring wheel slippage to perform a speed adjustment in controlling feedrate.

FIG. 4 illustrates a flow diagram showing one example operation of computing system 202 in measuring wheel slippage to perform a speed adjustment in controlling feedrate. For instance, operation 400 further details examples of processing described with respect to blocks 318 and 320 of FIG. 3.

At block 402, wheel slip measurement logic 224 measures wheel slippage of combine 100 during performance of an operation, during which, for example, combine 100 travels across a field. As discussed above with respect to FIGS. 2 and 3, wheel slip measurement logic 224 generates a signal indicative of a measure of wheel slippage such as a rate of slippage of combine 100 over a unit of time, or, for instance, a derived rate of change of wheel slippage of combine 100, or any other measure of wheel slippage.

At decision block 404, wheel slip processing logic 237 determines whether wheel speed of combine 100 should increase, based on the measured wheel slippage. In one example, wheel slip processing logic 237 receives an indication of the measured wheel slippage, as measured by wheel slip measurement logic 224, and, if not already done, calculates a degree or other quantification of current wheel slippage. The quantified current wheel slippage can be compared, by wheel slip processing logic 237, to a threshold value or other stored rate of wheel slippage. For instance, wheel slip processing logic 237 can determine that the quantified wheel slippage is above some threshold value of slippage (e.g., above a rate of slippage, or a current rate of slippage is determined to change more than a threshold rate of slippage per unit time, etc.). If wheel slip processing logic 237 determines that the current quantified value of wheel slippage is too large and, in turn, determines that wheel speed of combine 100 should not increase, wheel slip processing logic 237 generates a signal that indicates that the speed of combine 100 should not increase.

In such a situation, processing illustratively continues with block 416. At block 416, feedrate control signal generator logic 239 receives the signal generated by wheel slip processing logic 237 and does not request a speed increase (e.g., does not send a speed request signal to request a speed increase by speed output controller 246). As an example only, but not by limitation, when wheel slippage is likely to continue because the current wheel slippage is relatively high (e.g., if combine 100 is traveling on an incline of a muddy soil surface), then the logic 239 will not request an increase in the speed of combine 100 so as to prevent wheel slippage from becoming worse and therefore further worsening any attempts to maintain a relative feedrate of combine 100.

If, however, wheel slip processing logic 237 determines that wheel speed should increase based, at least in part, on the measured wheel slippage (e.g., wheel slip processing logic 237 determines that measured wheel slippage is below a threshold amount of slippage, such as being below a rate of slippage, or the rate of change of slippage is determined to be below a threshold amount), processing illustratively continues at block 406.

At block 406, feedrate processing logic 237 determines that attempting to compensate for the actual feedrate can be accomplished by increasing speed of combine 100. One particular example of increasing wheel speed that is illustratively shown at block 406 includes implementing an incremental increase in speed. Thus, at block 406, feedrate control signal generator logic 239 defines an incremental increase in speed. An incremental increase in speed, as generally described herein, includes the generation of a speed request signal by feedrate control signal generator logic 239 that requests an increase in speed of combine 100 by a defined amount. The incremental increase in speed can be a single value of speed increase or a series of values that increases speed of combine 100 incrementally. An increment, as described herein, generally includes a pre-defined amount of speed (e.g., value of RPMs, rotational acceleration, etc.) to be output to combine 100. For example, but not by limitation, an incremental speed increase can include a series of output signals that control combine 100 to increase output speed by an amount 'A', by an amount 'B', and by an amount 'C', in a series of progression, where all amounts are the same, where they successively decrease, or where they successively increase. Wheel slippage can be detected or measured between each successive incremental speed request signal and, if it increases by an undesirable amount, the next successive speed request signal can be to maintain or reduce the combine speed. A wide variety of other incremental speed increases can be defined by feedrate control signal generator logic 239 in accordance with block 406.

To further illustrate the features described with respect to block 406, it is noted that some increases in speed may be too large (e.g., too large of an increase in wheel speed over a previous speed and thus result in increased wheel slippage by the machine. Further increase in wheel slippage can lead to increased difficulty in even maintaining forward movement of the machine from the particular area at which slippage is occurring, and can further negatively impact any attempts to maintain a relatively constant feedrate. Thus, the speed can be increased incrementally, in one example.

Processing thus continues at block 408, which illustratively includes feedrate control signal generator logic 239 generating a speed request signal and providing it to speed output controller 246 based on the defined incremental increase in speed. That is, feedrate control signal generator logic 239 generates a speed request signal indicative of the defined incremental increase in wheel speed. The speed request signal can be indicative of an amount of speed to increase for a single increment, for a series of increments, for a series of progressively increasing or decreasing increments, etc., and provides the speed request signal to speed output controller 246.

In accordance with block 410, speed output controller 246 receives the generated speed request signal, from feedrate control signal generator logic 239, indicative of the increase in wheel speed to be applied to combine 100. In turn, speed output controller 246 generates a speed control signal to control speed of combine 100 according to the one or more increments of the received speed request signal. Block 410 also includes speed output controller 246 providing an indication of the generated speed control signal to propulsion system 244 for increasing rotational wheel speed, and thus attempting to increase ground speed of combine 100 according to the defined speed increase, For instance, speed output controller 246 generates instructions (e.g., the speed output control signal) to increase wheel speed of combine 100 by one or more constant increments or one or more increments as a series of progressively increasing or decreasing increments. Thus, the system attempts to increase the speed of the machine by increasing rotational speed of wheels (or other traction elements), to compensate for decreased feedrate without further increasing wheel slippage.

At block 412, wheel slip measurement logic 224 again detects wheel slippage, such as subsequent wheel slippage, in accordance with any of the features described herein of detecting and measuring wheel slippage of combine 100. Detecting and measuring subsequent wheel slippage can allow for subsequent determination of whether the incremental increase in wheel speed applied to combine 100 resulted in a further increase in wheel slippage or a reduction in wheel slippage, etc.

At decision block 414, wheel slip processing logic 237 receives a signal indicative of a subsequent measure of any detected wheel slippage as determined by wheel slip measurement logic 224. Again, subsequent determination at decision block 414 can be used to analyze the influence of attempting to mitigate negative effects of decreased feedrate on the performance of combine 100. That is, after implementing the incremental increase in speed to propulsion system 244, for example, the system analyzes whether that implemented increase caused a subsequent increase in wheel slippage or did not negatively affect subsequent wheel slippage. Therefore, if subsequent wheel slippage is still determined to be present by wheel slip processing logic 237, then processing reverts to block 402 to again measure the subsequent wheel slippage. If, however, at decision block 414, wheel slip processing logic 237 does not detect subsequent wheel slippage, then the current processing to increase speed illustratively ends.

In one example, before requesting an increase in speed, feedrate control logic 230 can estimate whether the request will negatively affect feedrate and, if so, refrain from making such a request. This can take place, for instance, at block 404 in FIG. 4.

Figure 5:
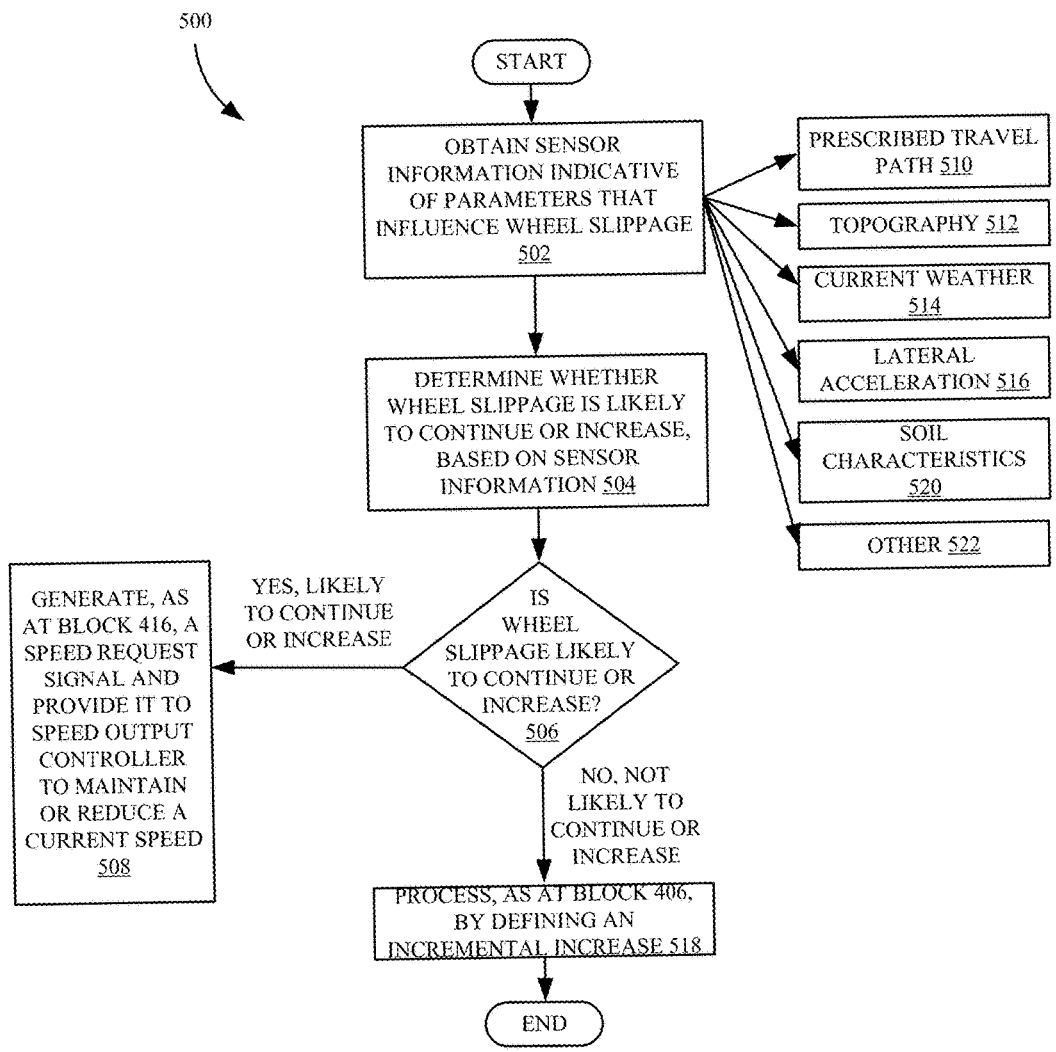
FIG. 5 illustrates a flow diagram showing one example operation of measuring a likelihood that wheel slippage will continue, to perform a speed adjustment.

FIG. 5 illustrates a flow diagram showing one example of the operation 500 of computing system 202 in determining whether wheel speed should increase as described above with respect to decision block 404 in FIG. 4.

Rather than attempting to compensate for decreased feedrate by implementing a fixed control loop that somewhat blindly increases speed of a machine when feedrate is determined to decrease, the present description can measure a level of slippage and analyze the likelihood of continued slippage according to other, additional operating characteristics and sensor information of combine 100 to determine an appropriate corrective action. Therefore, at block 502, wheel slip measurement logic 224 obtains sensor information indicative of parameters that influence wheel slippage of combine 100.

For example, wheel slip measurement logic 224 obtains sensor information indicative of a prescribed travel path 510, topography 512, weather 514, lateral acceleration 516, soil characteristics 520, and a wide variety of other sensor information and characteristics 518. Prescribed travel path information 510 can include any of wide variety of sensor information obtained from positioning logic 226 such as a series of GPS coordinates corresponding to a prescribed path for performing a harvesting operation, or stored historical path information that is stored in data store(s) 238 and indicates prior paths traveled by combine 100 in performing a current or a different historical operation (e.g., whether the machine is traveling directly along a prior path and thus whether wheels are currently aligned with a wheel rut caused by a prior operation, thereby potentially being indicative of increased potential of slippage along the wheel rut), among other information. Topography information 512 can generally include any of a wide variety of sensor information indicative of features of a current worksite area, such as but not limited to, incline information and changes in elevation. Weather information 514 can generally include any of a wide variety of sensor information indicative of environmental conditions such as current, past or future rainfall or precipitation, wind speed, frost permeation, etc. Lateral acceleration information 516 can generally include any of a wide variety of sensor information indicative of sideways motion of wheels and whether the sideways motion corresponds to information from positioning logic 226 such as a directional heading of the wheels (e.g., the directional heading is set for forward drive along a straight line, but sensors indicate lateral acceleration, thereby providing an indication that the combine is experiencing lateral slip, perhaps during attempted travel along a path that is perpendicular to an incline). Soil characteristics 520 can generally include any of a wide variety of sensor information indicative of ground surface conditions such as, but not limited to, soil softness, ground surface composition, soil moisture, or a wide variety of other information. Any and or all of this sensor information can be utilized by wheel slip measurement logic 224 to measure how likely it is that wheel slippage of combine 100 will continue, increase, or decrease, in addition to the level of slippage measured by a comparison of a rotational speed of the wheels to a travel speed of combine 100, as described above.

At block 504, wheel slip processing logic 237 is configured to determine whether wheel slippage is likely to continue, based on the sensor information. In one example, wheel slip processing logic 237 analyzes the sensor information, and based on the sensor information determines that wheel slippage is likely to continue at decision block 506. Based on such a determination, processing continues at block 508.

At block 508, feedrate control signal generator logic 239 receives an indication from wheel slip processing logic 237 that indicates that wheel slippage is likely to continue. It, in turn, generates a speed request signal to maintain or reduce a current speed of combine 100 (as described above with respect to block 416 in FIG. 4). That is, feedrate control signal generator logic 239 provides the speed request signal to speed output controller 246 to maintain or reduce a current speed, and speed output controller 246 can generate and implement a speed control signal accordingly. For example, but not by limitation, if wheel slippage is likely to continue or increase, then system 230 illustratively refrains from requesting any increase in combine speed and instead requests maintaining a current speed of the combine or reducing a current speed.

If, however, feedrate control signal generator logic 239 receives an indication from wheel slip processing logic 237 that indicates that wheel slippage is not likely to continue, it, in turn, generates a speed request signal to increase speed by, in one example, defining an increase in speed (e.g., see similar features of feedrate control signal generator logic 239 defining an increase in speed, as described with respect to block 406 of FIG. 4).

Figure 6:
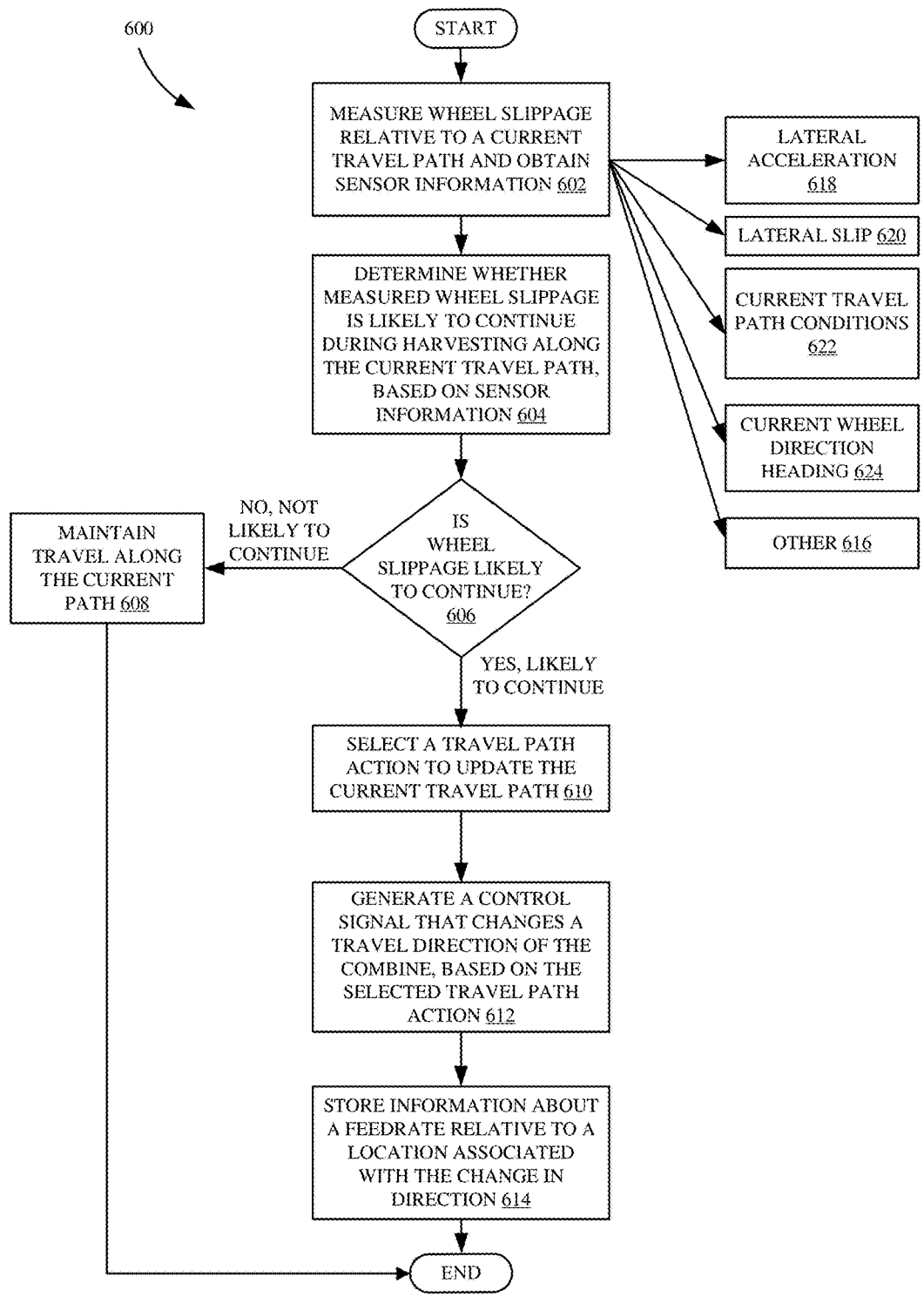
FIG. 6 illustrates a flow diagram showing one example operation of measuring wheel slippage to perform a travel path action in controlling feedrate.

FIG. 6 illustrates a flow diagram showing one example operation of computing system 202 in measuring wheel slippage to perform a travel path action in controlling feedrate. Prior to discussing the details of FIG. 6, it will be noted that while performing a harvesting operation, it may be desired to maintain travel along a path across a field. For instance, maintaining travel along a pre-defined path may be beneficial for a variety of reasons, such as attempting to maintain feedrate and reduce grain loss. However, under certain circumstances, the benefits of maintaining travel along a prescribed path may not outweigh the negative effects on performance of the machine. For instance, when wheel slippage is detected, attempting to change speed of a combine while maintaining directional headings to continue along the prescribed path may not be the most efficient operation. In addition, or as an alternative to adjusting a speed output, a travel path action can be selected to move the combine along a different path that will reduce wheel slippage, and therefore improve performance of the combine in attempting to maintain a feedrate. This, as discussed in further detail below, may be useful when a combine is traveling along a prescribed path over an incline or a relatively aggressive change in elevation, and when environmental conditions like rain and soft ground are also taken into consideration from obtained sensor information.

At block 602, wheel slip measurement logic 224 measures wheel slippage. Wheel slip measurement logic 224 can obtain sensor information indicative of lateral acceleration 618, lateral slip 620, current travel path conditions 622, a current wheel direction heading 624, or a wide variety of other sensor information 616. Lateral acceleration information 618 can generally include any of a wide variety of sensor information indicative of sideways motion of wheels and whether the sideways motion corresponds to information from positioning logic 226 such as a directional heading of the wheels, while lateral slip can include any sensor information indicative of sideways motion being greater than friction between wheels and the ground surface (e.g., lateral acceleration and slip as described herein with respect to FIG. 5). Current travel path conditions 622 can include any sensor information indicative of a current position and heading of combine 100, such as that received from positioning logic 226. Conditions 622 can also be indicative of a soil or other ground condition (e.g., sensed soil softness, soil moisture, or ground surface temperature, etc.). Current wheel direction heading 624 can include any sensor information indicative of steering angle or wheel directional position as received from positioning logic 226 or sensor(s) 214.

At block 604, wheel slip processing logic 237 receives the wide variety of sensor information and, based on the received sensor information and measured wheel slippage, determines whether wheel slippage is likely to continue at an undesirable level during harvesting along the current travel path. For instance, wheel slip processing logic 237 can receive indications of sensor information, such as sensor information 618, 620, 622, 624, 616, and determines whether wheel slippage is likely to continue based on the sensor information in addition to any of a wide variety of other indications of sensor information such as that obtained from positioning logic 226. As an example, but not by limitation, wheel slip processing logic 237 can determine that lateral slip 620 of combine 100 indicates that combine 100 is deviating from directional heading 622 associated with a vector of a current travel path generated by positioning logic 226, and in turn determine that slippage is likely to continue. Additional information such as an indication that combine 100 is attempting to travel along the vector, which defines a travel path perpendicular to, or parallel to, a slope of an area of increased elevation (e.g., it is going along a sidehill or uphill), and soil moisture is high (indicating muddy soil) for example, can further be utilized to determine that wheel slippage is likely to continue.

If wheel slip processing logic 237 receives the sensor information and, based on the received sensor information, determines that wheel slippage is not likely to continue during harvesting along the current travel path, processing illustratively proceeds to block 608 to maintain travel along the current path.

If, however, wheel slip processing logic 237 receives the sensor information and, based on the received sensor information, determines that wheel slippage is likely to continue, then processing illustratively proceeds to block 610 to select a travel path action to update the current travel path.

At block 610, feedrate control signal generator logic 239 can select a travel path action for combine 100 based on the determination that wheel slippage is likely to continue along the current travel path. The travel path action can indicate any of a wide variety of actions such as, but not limited to, an action to modify a prescribed vector and updating the path according to the modified vector, or an action to update a wheel direction heading to compensate for lateral acceleration and/or slip (e.g., to trim the wheels uphill).

At block 612, feedrate control signal generator logic 239 generates a requested travel path action control signal indicative of the action to be implemented to update a current travel path of combine 100, based on the selected travel path action. For instance, feedrate control signal generator logic 239 can utilize positioning logic 226 to generate a control signal to control combine 100, such as controllable subsystems(s) 240, to adjust the travel direction of combine 100 in attempting to compensate for the feedrate errors caused by slippage along a current path.

At block 614, feedrate control logic 230 generates an instruction signal that instructs computing system 202 to store an indication of the selected and implemented travel path action. For example, feedrate control logic 230 can instruct computing system 202 to store an indication of the actual feedrate relative to a location associated with the change in direction implemented in accordance with the generation of the control signal at block 612. For instance, the information can be stored in data store(s) 238. Other information can be stored as well, or instead, such as information indicative of the measured wheel slippage, its corresponding location, any change in direction in accordance with the travel path action discussed above, etc.

It is noted that while combines have been particularly discussed with respect to the examples described herein, other agricultural machines can also be implemented with said examples, and thus the present disclosure is not limited to use of the systems and processes discussed with merely combine machines.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
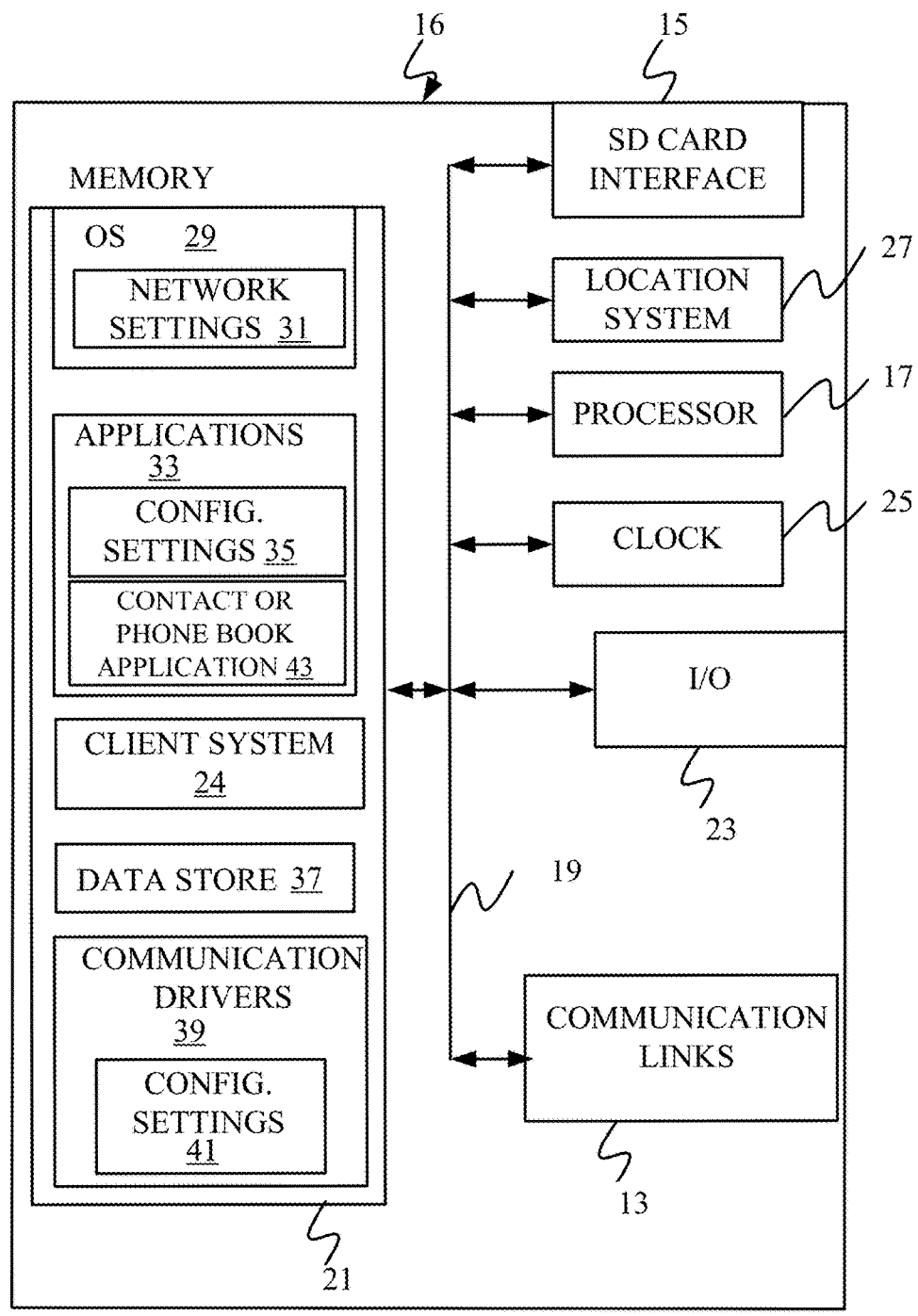
FIGS. 7-9 show examples of mobile devices that can be used in the architectures shown in the previous figures.
Figure 8:
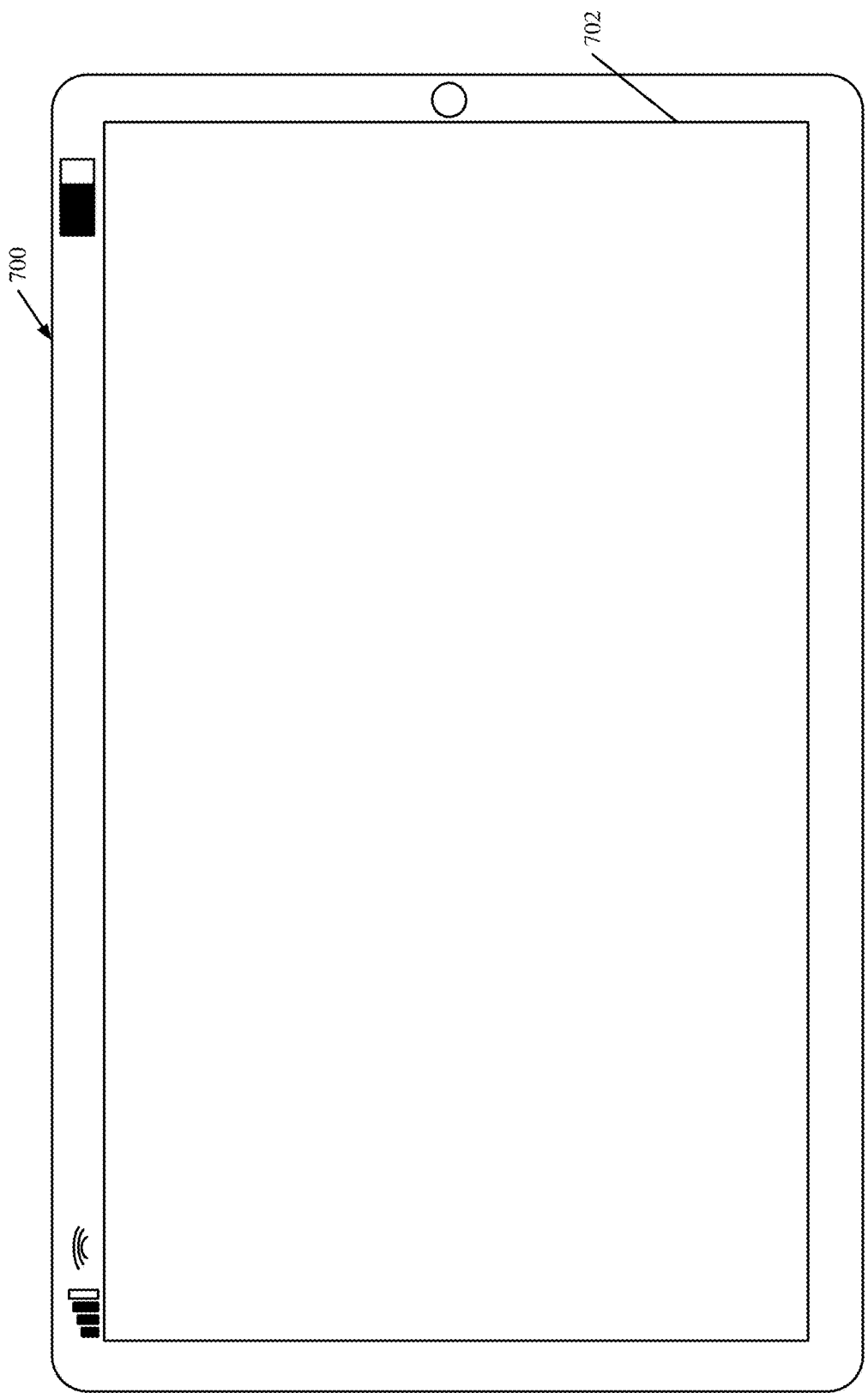
Figure 9:
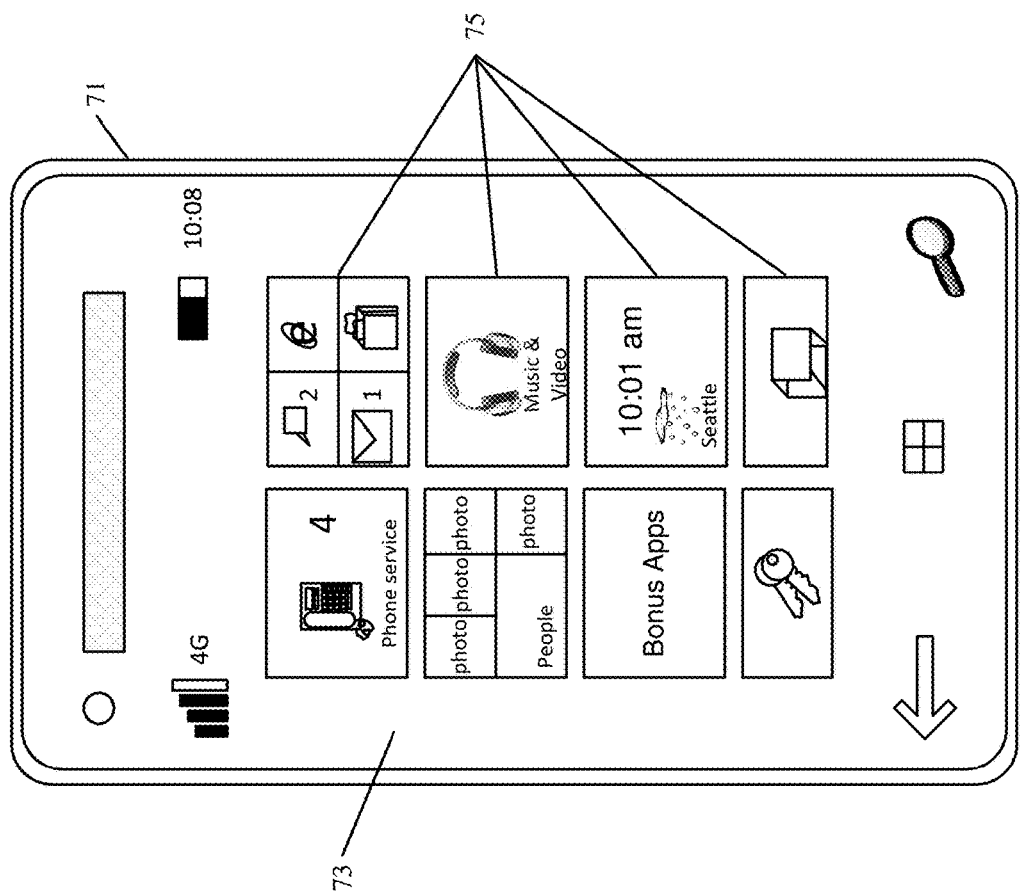

FIG. 7 is a simplified block diagram of one illustrative example of a handheld or mobile computing device that can be used as a user's or client's hand held device 16, in which the present system (or parts of it) can be deployed. For instance, a mobile device can be deployed as computing system 202 in the operator compartment of combine 100 for use in generating, processing, or displaying the information discussed herein and in generating a control interface. FIGS. 8-9 are examples of handheld or mobile devices.

FIG. 7 provides a general block diagram of the components of a client device 16 that can run some components shown in FIG. 2, that interacts with them, or both. In the device 16, a communications link 13 is provided that allows the handheld device to communicate with other computing devices and in some examples provide a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 700. In FIG. 8, computer 700 is shown with user interface display screen 702. Screen 702 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 700 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
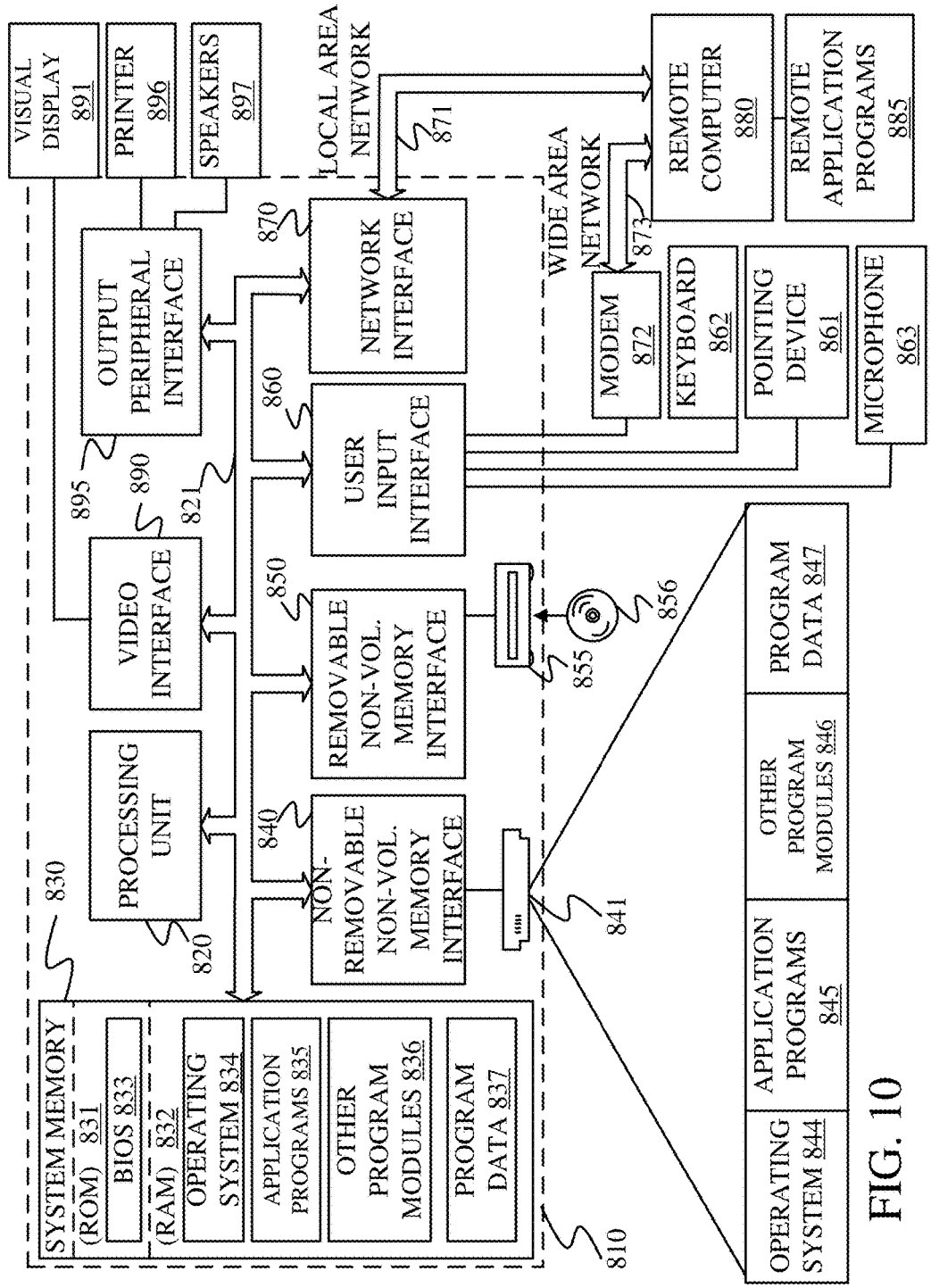
FIG. 10 is a block diagram showing one example of a computing environment that can be used in the architectures shown in the previous figures.

FIG. 10 is one example of a computing environment in which elements of FIG. 2, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile harvesting machine, comprising:
a propulsion system;
feedrate control logic that identifies a feedrate difference between a prescribed feedrate of material through the mobile harvesting machine and a sensed feedrate of material through the mobile harvesting machine and that receives an indication of wheel slippage on the mobile harvesting machine and that generates a speed request signal to modify a speed of the mobile harvesting machine based on the feedrate difference and the indication of wheel slippage; and
a control system that receives the speed request signal and generates a speed control signal to control the propulsion system based on the speed request signal.

Example 2 is the mobile harvesting machine of any or all previous examples and further comprising:
wheel slip measurement logic configured to generate a first measure of the wheel slippage.

Example 3 is the mobile harvesting machine of any or all previous examples wherein the feedrate control logic comprises:
feedrate control signal generator logic configured to generate the speed request signal.

Example 4 is the mobile harvesting machine of any or all previous examples wherein the feedrate control logic comprises:
wheel slip processing logic configured to determine whether the feedrate control signal generator logic generates a speed request signal to increase wheel speed based on the first measure of wheel slippage and the feedrate difference.

Example 5 is the mobile harvesting machine of any or all previous examples wherein the wheel slip measurement logic is configured to generate a second measure of wheel slippage after the feedrate control signal generator generates a speed request signal to increase the speed of the mobile harvesting machine.

Example 6 is the mobile harvesting machine of any or all previous examples wherein the wheel slip processing logic is configured to identify any difference between the first measure of wheel slippage and the second measure of wheel slippage and to determine whether the feedrate control signal generator logic generates a speed request signal to increase wheel speed based on the difference between the first and second measures of wheel slippage and the feedrate difference.

Example 7 is the mobile harvesting machine of any or all previous examples wherein the wheel slip processing logic is configured to control the feedrate control signal generator logic to generate the speed request signal to decrease the speed of the mobile harvesting machine if the second measure of wheel slippage is greater than the first measure of wheel slippage.

Example 8 is the mobile harvesting machine of any or all previous examples wherein the wheel slip processing logic is configured to control the feedrate control signal generator logic to generate the speed request signal as a set of speed request signals, each requesting a corresponding incremental increase in speed.

Example 9 is the mobile harvesting machine of any or all previous examples wherein the wheel slip measurement logic is configured to generate a measure of wheel slippage, after the feedrate control signal generator logic generates each speed request signal that requests the corresponding incremental increase in speed, to determine whether wheel slippage has increased since a last speed request signal requested its corresponding increase in speed.

Example 10 is the mobile harvesting machine of any or all previous examples wherein the wheel slip processing logic is configured to receive a soil characteristic signal indicative of a soil characteristic and to determine whether wheel slip is likely, based on the soil characteristic signal and to control the feedrate control signal generator logic to generate the speed request signal based on whether wheel slip is likely.

Example 11 is the mobile harvesting machine of any or all previous examples wherein the wheel slip processing logic is configured to receive a topology signal indicative of a topology of terrain over which the mobile harvesting machine is traveling and to determine whether wheel slip is likely, based on the topology signal and to control the feedrate control signal generator logic to generate the speed request signal based on whether wheel slip is likely.

Example 12 is a computer implemented method of controlling a mobile harvesting machine, comprising:
identifying a prescribed feedrate of material through the mobile harvesting machine;
detecting a feedrate of material through the mobile harvesting machine;
identifying a feedrate difference between the prescribed feedrate and the sensed feedrate;
detecting wheel slippage on the mobile harvesting machine;
generating a speed request signal to adjust a speed of the mobile harvesting machine based on the feedrate difference and the indication of wheel slippage; and
receiving the speed request signal at a control system and generating, at the control system, a speed control signal to control a propulsion system based on the speed request signal.

Example 13 is the computer implemented method of any or all previous examples wherein detecting wheel slippage comprises:
generating a first measure of the detected wheel slippage, and wherein generating the speed request signal includes generating the speed request signal based on the measure of the detected wheel slippage.

Example 14 is the computer implemented method of any or all previous examples wherein generating the speed request signal comprises:

determining whether increased wheel slippage is likely if a wheel speed of the mobile harvesting machine is increased; and generating the speed request signal to maintain or decrease the speed of the mobile harvesting machine if wheel slippage is likely to increase if the wheel speed of the mobile harvesting machine is increased, Example 15 is the mobile harvesting machine of any or all previous examples wherein generating the speed request signal comprises:

generating a second measure of wheel slippage after the feedrate control signal generator generates a speed request signal to increase the speed of the mobile harvesting machine;

identifying any difference between the first measure of wheel slippage and the second measure of wheel slippage; and if the second measure is greater than the first measure, then generating the speed request signal to maintain or decrease the speed of the mobile harvesting machine.

Example 16 is the computer implemented method of any or all previous examples wherein generating a speed request signal comprises:

if the feedrate difference indicates that the detected feedrate is below the prescribed feedrate by an identified amount, then generating a set of speed request signals to increase the speed of the mobile harvesting machine from a first speed to a second speed, wherein generating the set of speed request signals comprises:

generating successive speed request signals, each successive speed request signal requesting an incremental increase in the speed of the mobile harvesting machine;

after each speed request signal is generated, measuring the detected wheel slippage to determine whether the detected wheel slippage has increased; and if the detected wheel slippage has increased, then generating a next successive speed request signal to decrease the speed of the mobile harvesting machine.

Example 17 is a mobile harvesting machine, comprising:
a propulsion system;
wheel slip detection logic configured to detect wheel slip on the mobile harvesting machine and generate a wheel slip signal indicative of the detected wheel slip;
a feedrate detector that detects a feedrate of material through the mobile harvesting machine;
a feedrate controller that identifies a feedrate difference between a prescribed feedrate of material through the mobile harvesting machine and the detected feedrate of material through the mobile harvesting machine and that receives the wheel slip signal and, if the feedrate difference indicates that the detected feedrate is below the prescribed feedrate by an amount, the feedrate controller generates a speed request signal to increase a speed of the mobile harvesting machine based on the wheel slip signal; and
a control system that receives the speed request signal and generates a speed control signal to control the propulsion system based on the speed request signal.

Example 18 is the mobile harvesting machine of any or all previous examples wherein if the wheel slip signal indicates that the detected wheel slip is above a wheel slip threshold, then the feedrate controller is configured to generate the speed request signal to the control system to maintain or decrease the speed of the mobile harvesting machine.

Example 19 is a computer implemented method of controlling a mobile harvesting machine, comprising:

identifying a prescribed feedrate of material through the mobile harvesting machine; detecting a feedrate of material through the mobile harvesting machine;

identifying a feedrate difference between the prescribed feedrate and the sensed feedrate;

detecting wheel slippage on the mobile harvesting machine;

determining whether the detected wheel slippage is likely to increase if a wheel speed of the mobile harvesting machine is increased;

generating an indication indicative of whether the detected wheel slippage is likely to increase if the wheel speed of the mobile harvesting machine is increased;

generating a speed request signal to modify a speed of the mobile harvesting machine based on the feedrate difference and the indication of whether the detected wheel slippage is likely to increase; and receiving the speed request signal at a control system and generating, at the control system, a speed control signal to control a propulsion system based on the speed request signal.

Example 20 is the computer implemented method of any or all previous examples wherein determining whether the detected wheel slippage is likely to increase comprises:

generating a measure of the detected wheel slippage; and determining, based on the measure of the detected wheel slippage, whether the detected wheel slippage is likely to increase.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile harvesting machine, comprising:
a propulsion system;
feedrate control logic that identifies a feedrate difference between a prescribed feedrate of material through the mobile harvesting machine and a sensed feedrate of material through the mobile harvesting machine and that receives an indication of wheel slippage on the mobile harvesting machine and that generates a speed request signal to modify a speed of the mobile harvesting machine based on the feedrate difference and the indication of wheel slippage; and
a control system that receives the speed request signal and generates a speed control signal to control the propulsion system based on the speed request signal.

2. The mobile harvesting machine of claim 1 and further comprising:
wheel slip measurement logic configured to generate a first measure of the wheel slippage.

3. The mobile harvesting machine of claim 2 wherein the feedrate control logic comprises:
feedrate control signal generator logic configured to generate the speed request signal.

4. The mobile harvesting machine of claim 3 wherein the feedrate control logic comprises:
wheel slip processing logic configured to determine whether the feedrate control signal generator logic generates a speed request signal to increase wheel speed based on the first measure of wheel slippage and the feedrate difference.

5. The mobile harvesting machine of claim 4 wherein the wheel slip measurement logic is configured to generate a second measure of wheel slippage after the feedrate control signal generator generates a speed request signal to increase the speed of the mobile harvesting machine.

6. The mobile harvesting machine of claim 5 wherein the wheel slip processing logic is configured to identify any difference between the first measure of wheel slippage and the second measure of wheel slippage and to determine whether the feedrate control signal generator logic generates a speed request signal to increase wheel speed based on the difference between the first and second measures of wheel slippage and the feedrate difference.

7. The mobile harvesting machine of claim 6 wherein the wheel slip processing logic is configured to control the feedrate control signal generator logic to generate the speed request signal to decrease the speed of the mobile harvesting machine if the second measure of wheel slippage is greater than the first measure of wheel slippage.

8. The mobile harvesting machine of claim 4 wherein the wheel slip processing logic is configured to control the feedrate control signal generator logic to generate the speed request signal as a set of speed request signals, each requesting a corresponding incremental increase in speed.

9. The mobile harvesting machine of claim 8 wherein the wheel slip measurement logic is configured to generate a measure of wheel slippage, after the feedrate control signal generator logic generates each speed request signal that requests the corresponding incremental increase in speed, to determine whether wheel slippage has increased since a last speed request signal requested its corresponding increase in speed.

10. The mobile harvesting machine of claim 4 wherein the wheel slip processing logic is configured to receive a soil characteristic signal indicative of a soil characteristic and to determine whether wheel slip is likely, based on the soil characteristic signal and to control the feedrate control signal generator logic to generate the speed request signal based on whether wheel slip is likely.

11. The mobile harvesting machine of claim 10 wherein the wheel slip processing logic is configured to receive a topology signal indicative of a topology of terrain over which the mobile harvesting machine is traveling and to determine whether wheel slip is likely, based on the topology signal and to control the feedrate control signal generator logic to generate the speed request signal based on whether wheel slip is likely.

12. A computer implemented method of controlling a mobile harvesting machine, comprising:
identifying a prescribed feedrate of material through the mobile harvesting machine;
detecting a feedrate of material through the mobile harvesting machine;
identifying a feedrate difference between the prescribed feedrate and the sensed feedrate;
detecting wheel slippage on the mobile harvesting machine;
generating a speed request signal to adjust a speed of the mobile harvesting machine based on the feedrate difference and the indication of wheel slippage; and
receiving the speed request signal at a control system and generating, at the control system, a speed control signal to control a propulsion system based on the speed request signal.

13. The computer implemented method of claim 12 wherein detecting wheel slippage comprises:
generating a first measure of the detected wheel slippage, and wherein generating the speed request signal includes generating the speed request signal based on the measure of the detected wheel slippage.

14. The computer implemented method of claim 13 wherein generating the speed request signal comprises:
determining whether increased wheel slippage is likely if a wheel speed of the mobile harvesting machine is increased; and
generating the speed request signal to maintain or decrease the speed of the mobile harvesting machine if wheel slippage is likely to increase if the wheel speed of the mobile harvesting machine is increased.

15. The mobile harvesting machine of claim 13 wherein generating the speed request signal comprises:
generating a second measure of wheel slippage after the feedrate control signal generator generates a speed request signal to increase the speed of the mobile harvesting machine;
identifying any difference between the first measure of wheel slippage and the second measure of wheel slippage; and
if the second measure is greater than the first measure, then generating the speed request signal to maintain or decrease the speed of the mobile harvesting machine.

16. The computer implemented method of claim 12 wherein generating a speed request signal comprises:
if the feedrate difference indicates that the detected feedrate is below the prescribed feedrate by an identified amount, then generating a set of speed request signals to increase the speed of the mobile harvesting machine from a first speed to a second speed, wherein generating the set of speed request signals comprises:
generating successive speed request signals, each successive speed request signal requesting an incremental increase in the speed of the mobile harvesting machine;
after each speed request signal is generated, measuring the detected wheel slippage to determine whether the detected wheel slippage has increased; and
if the detected wheel slippage has increased, then generating a next successive speed request signal to decrease the speed of the mobile harvesting machine.

17. A mobile harvesting machine, comprising:
a propulsion system;
wheel slip detection logic configured to detect wheel slip on the mobile harvesting machine and generate a wheel slip signal indicative of the detected wheel slip;
a feedrate detector that detects a feedrate of material through the mobile harvesting machine;
a feedrate controller that identifies a feedrate difference between a prescribed feedrate of material through the mobile harvesting machine and the detected feedrate of material through the mobile harvesting machine and that receives the wheel slip signal and, if the feedrate difference indicates that the detected feedrate is below the prescribed feedrate by an amount, the feedrate controller generates a speed request signal to increase a speed of the mobile harvesting machine based on the wheel slip signal; and
a control system that receives the speed request signal and generates a speed control signal to control the propulsion system based on the speed request signal.

18. The mobile harvesting machine of claim 17 wherein if the wheel slip signal indicates that the detected wheel slip is above a wheel slip threshold, then the feedrate controller is configured to generate the speed request signal to the control system to maintain or decrease the speed of the mobile harvesting machine.

19. A computer implemented method of controlling a mobile harvesting machine, comprising:

identifying a prescribed feedrate of material through the mobile harvesting machine;

detecting a feedrate of material through the mobile harvesting machine;

identifying a feedrate difference between the prescribed feedrate and the sensed feedrate;

detecting wheel slippage on the mobile harvesting machine;

determining whether the detected wheel slippage is likely to increase if a wheel speed of the mobile harvesting machine is increased;

generating an indication indicative of whether the detected wheel slippage is likely to increase if the wheel speed of the mobile harvesting machine is increased;

generating a speed request signal to modify a speed of the mobile harvesting machine based on the feedrate difference and the indication of whether the detected wheel slippage is likely to increase; and receiving the speed request signal at a control system and generating, at the control system, a speed control signal to control a propulsion system based on the speed request signal.

20. The computer implemented method of claim 19 wherein determining whether the detected wheel slippage is likely to increase comprises:

generating a measure of the detected wheel slippage; and determining, based on the measure of the detected wheel slippage, whether the detected wheel slippage is likely to increase.

\* \* \* \* \*